United States Patent [19]

Hopper et al.

[11] Patent Number: 4,806,290

[45] Date of Patent: Feb. 21, 1989

[54] LOW DENSITY MICROCELLULAR CARBON OR CATALYTICALLY IMPREGNATED CARBON FORMS AND PROCESS FOR THEIR PREPARATION

[75] Inventors: Robert W. Hopper, Danville; Richard W. Pekala, Pleasant Hill, both of Calif.

[73] Assignee: The United States of America as represented by the The United States Department of Energy, Washington, D.C.

[21] Appl. No.: 174,923

[22] Filed: Mar. 29, 1987

Related U.S. Application Data

[62] Division of Ser. No. 44,253, Apr. 30, 1987, Pat. No. 4,756,898.

[51] Int. Cl.$^4$ .............................................. C01B 31/02
[52] U.S. Cl. .................................... 264/28; 264/29.1; 264/29.7; 423/445; 423/449; 502/182; 502/185
[58] Field of Search ............... 502/182, 185, 427, 416, 502/423, 437, 184, 180; 423/445, 460, 449, 461; 264/29.1, 28

[56] References Cited

U.S. PATENT DOCUMENTS

| | | | |
|---|---|---|---|
| 3,345,440 | 10/1967 | Googin et al. | 264/29.1 |
| 3,810,963 | 5/1974 | Benton et al. | 264/29.1 |
| 4,125,676 | 11/1978 | Maricle et al. | 429/38 |
| 4,263,268 | 4/1981 | Knox et al. | 423/445 |
| 4,276,246 | 6/1981 | Bonzom et al. | 423/445 |

*Primary Examiner*—Jan H. Silbaugh
*Assistant Examiner*—Allan R. Kuhns
*Attorney, Agent, or Firm*—Gary C. Roth; L. E. Carnahan; Judson R. Hightower

[57] ABSTRACT

Machinable and structurally stable, low density microcellular carbon, and catalytically impregnated carbon, foams, and process for their preparation, are provided. Pulverized sodium chloride is classified to improve particle size uniformity, and the classified particles may be further mixed with a catalyst material. The particles are cold pressed into a compact having internal pores, and then sintered. The sintered compact is immersed and then submerged in a phenolic polymer solution to uniformly fill the pores of the compact with phenolic polymer. The compact is then heated to pyrolyze the phenolic polymer into carbon in the form of a foam. Then the sodium chloride of the compact is leached away with water, and the remaining product is freeze dried to provide the carbon, or catalytically impregnated carbon, foam.

2 Claims, No Drawings

LOW DENSITY MICROCELLULAR CARBON OR CATALYTICALLY IMPREGNATED CARBON FORMS AND PROCESS FOR THEIR PREPARATION

The U.S. Government has rights in this invention pursuant to Contract No. w-7405-ENG-48 between the U.S. Department Of Energy and the University Of California for the operation of the Lawrence Livermore National Laboratory.

This is a division of application Ser. No. 044,253, filed Apr. 30, 1987, now U.S. Pat. No. 4,756,898, issued July 12 1988.

BACKGROUND OF THE INVENTION

The invention described herein relates generally to carbon foams, and especially to processes for preparing low density microcellular carbon, and catalytically impregnated carbon, foams.

There are many, both presently existing and potential, beneficial uses for carbon foams. For example, carbon foams have been used as parts for inertial confinement fusion targets, as absorbers of toxic and hazardous gases, and as structural parts requiring unique properties related to X-ray opacity. Very possibly, in applications where large and highly reactive surface areas of catalysts such as platinum, palladium and nickel must be exposed to unsaturated hydrocarbon gases in their catalytic decomposition, it appears that it would be highly beneficial to provide low density, microcellular foams comprised of catalytically impregnated carbon. In these and similar applications, it would clearly be very advantageous to make carbon foams having both a cell size and a density that were, at the same time, independently controllable. It would be especially advantageous to fabricate carbon foams simultaneously having a low density and a very small cell size. It would be beneficial if the small cell size were very uniform and could be tailored to be within the 5 to 30 micron range. Additionally, it would be highly desirable if these tailored carbon foams were free of impurity and structurally stable so that they could be easily fabricated into parts of various size and shape. Unfortunately, the presently known methods for preparing carbon foams are inadequate for producing these tailored foams.

One prior art method for preparing carbon foam is described by Benton et al in Carbon 10, pages 185 to 190 (1972). In this method, hollow phenolic or carbon microspheres are mixed with a binder material consisting of liquid furfuryl alcohol, maleic anhydride, powdered pitch, and acetone. The moist mixture is cured under conditions of elevated temperature and pressure. Then the cured mixture is carbonized at high temperature in an argon-purged furnace. This carbonizing, or coking operation produces a significant shrinkage of the resultant carbon foam, which possesses a high compressive strength and a relatively low density. However, the cell size of the carbon foam made by this method tends to be relatively large, and cell size and density cannot be simultaneously and independently controlled to provide carbon foams of low density and small cell size.

Processes for producing reticulated, or weblike, polymeric foams by removing the cell membranes from conventional polymeric foams are described by Geen in the "Encyclopedia of Polymer Science and Technology", Volume 12, pages 102 to 104, Interscience Publishers (1970). Polyester-derived polyurethane foams may be reticulated by alkaline hydrolysis, which preferentially etches away the foam membranes, leaving an open skeletal structure. In another method, called explosion reticulation, the air within a foam is removed and replaced with an explodable gas mixture. Ignition of the mixture results in a controlled explosion which removes the thinner membranes. Reticulated carbon foams can be produced by the pyrolysis of polyurethane foams that have been reticulated by either of these methods. Unfortunately, the resulting reticulated carbon foams cannot be fabricated to simultaneously meet the aforementioned desirable cell size and density specifications.

Thus, the problem remains of readily preparing machinable and structurally stable, tailored low density and microcellular carbon, and catalytically impregnated carbon, foams.

SUMMARY OF THE INVENTION

It is, therefore, an object of the invention to provide machinable and structurally stable, tailored low density and microcellular carbon, and catalytically impregnated carbon, foams, and process for their preparation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, machinable and structurally stable, tailored low density and microcellular carbon foam may be produced by the process of pressing a quantity of pulverized sodium chloride particles into a sodium chloride compact, having internal pores, and then sintering the compact. The sintered compact is then partially immersed in a solution comprised of a phenol-formaldehyde A-stage polymeric phenolic resin of either the resole type or the novolac type dissolved in a solvent selected from the group consisting of tetrahydrofuran, acetone, methyl ethyl ketone, and ethanol, so that capillary action forces the solution to completely fill the internal pores of the sintered compact. When the phenolic resin is of the novolac type, it is preferred that the solution additionally contain a crosslinking agent selected from the group consisting of hexamethylene tetra-amine and para-formaldehyde. Following immersion, the compact is then submerged in the solution until a uniform concentration of phenolic resin diffuses throughout the compact. As the next step, the sintered sodium chloride compact is heated until the phenolic resin pyrolyzes essentially without shrinkage into a carbon foam whose cell size is determined by the particle size distribution of the pulverized sodium chloride particles that comprise the sintered compact. After cooling, essentially all the sodium chloride of the sintered compact is leached away with water from the entrained carbon foam. When the water-wet, carbon foam is freeze dried, the desired machinable and structurally stable carbon foam remains.

As an additional and preliminary step in the above described process, it is freouently preferred to classify the pulverized sodium chloride particles to remove boh fines and large particles. This is accomplished by passing the pulverized particles through an air classification system. The classified pulverized sodium chloride particles are then pressed into a compact. When this compact is processed as described above, the resulting product is a machinable and structurally stable, low density microcellular carbon foam.

In a further aspect of the present invention, in accordance with its objects and purposes, catalytically impregnated carbon foam, that is machinable and structurally stable, may be prepared by first, before pressing them into a compact, mixing the pulverized sodium chloride particles with a sub-micron size powder comprised of a catalyst material selected from the group consisting of platinum, palladium, and nickel. These pulverized sodium chloride and catalyst material particles are then pressed into a compact and processed as described above to produce a catalytically impregnated carbon foam that is machinable and structurally stable.

In yet another aspect of the present invention, if the pulverized sodium chloride particles are first classified to remove fines and large particles, as discussed above, prior to being mixed with catalyst material powder, the method of this invention can provide a low density microcellular carbon foam that is catalytically impregnated as well as being machinable and structurally stable.

The benefits and advantages of the present invention, as embodied and broadly described herein, include the provision of low density microcellular carbon foams that are machinable and structurally stable. Further, this invention provides such carbon foams that additionally are catalytically impregnated.

DETAILED DESCRIPTION OF THE INVENTION

Reference will now be made in detail to the present preferred embodiment of the invention. The invention requires, as a starting material, pulverized sodium chloride particles. This is a very common and readily available material. For example, the food grade salt product named EF325, where the EF stands for Extra Fine, supplied by the Morton Thiokol Corporation, Ventron Division, of Danvers, Mass., has been found to be competent in the performance of this invention. This particular salt is pulverized to −325 mesh, which means that the sodium chloride particles will all pass through a 44 micron sieve. Any similar salt product will be at least adequate in carrying out the processes herein described. For many applications the as-received pulverized sodium chloride does not require further classification. However, in other applications it is required that the as-received pulverized sodium chloride be classified to remove both fines and large particles. This classification may be beneficially performed by any commercially available air classification system, such as the ACUCUT Model A-12 air classification system that is supplied by the Donaldson Company of Minneapolis, Minn. Air classification systems are commonly and generally available articles of laboratory equipment, and very well known in the prior art. As a typical example, when one quantity of Morton EF325 salt was classified by an ACUCUT Model A-12 air classification system, the mean particle size, on a weight basis, of the pulverized sodium chloride typically increased from about 15 to 17 microns, however, the particle size distribution became considerably narrower. It has been discovered that it is often preferable if the processes of this invention are carried out with a starting material of sodium chloride particles that have been classified, by passage through an air classification system, to have a mean particle size in the approximate range from 10 to 20 microns on a weight basis. However, in other situations it may be beneficial to otherwise tailor the size distribution of the pulverized sodium chloride particles, as desired, for example by the process of jet milling.

The next step in the process of this invention is to cold press a ouantity of the pulverized sodium chloride particles into a sodium chloride compact having internal pores. It is preferable that the cold pressing be carried out at a pressure in the approximate range from 2000 to 5000 pounds per square inch, for a time of approximately 1 to 5 minutes. This results in the sodium chloride compact having a density in the approximate range from 60 to 65 percent of the theoretical density of sodium chloride, which is 2.165 gm/cm$^3$. Compacts pressed to a higher density than the range indicated tend to have closed voids, which leads to a discontinuous and thus undesired structure in the resultant carbon foam as well as limiting the density range thereof. This cold pressing operation may preferably be performed with any standard laboratory press, such as the Model C supplied by Fred S. Carver, Inc., a subsidiary of Sterling, Inc. of Menomonee Falls, Wis. Alternatively, this step may be performed by the well-known technique of cold isostatic pressing. In cold pressing sodium chloride particles into compacts having the shape of bars, it has been observed that plating the inner surfaces of the mold with a nickel-phosphorus coating to inhibit corrosion, and providing the inner side walls of the mold with a one degree draft to assist in compact ejection, are advantageous. As a practical matter, it has been observed that it is sometimes advantageous to perform this pressing operation under conditions of reduced humidity.

Following the cold pressing operation, the resulting sodium chloride compact is sintered. Sintering is performed by heating the compact in a laboratory furnace at the approximate rate of 1 degree centigrade per minute to the temperature of approximately 650 to 725 degrees centigrade, maintaining that temperature for approximately 2 to 12 hours, and then shutting off the power to the laboratory furnace and allowing the compact to slowly cool. In the practice of this invention this sintering step may be performed by any appropriate laboratory furnace, such as the Model Number 11893, three-zone tube furnace supplied by the Marshall Company of Scotts Valley, Calif. It is also convenient to monitor the sintering operation with one K-type, chromel-alumel, thermocouple per hot zone, and to control the process with a multichannel programmer/controller such as the Micricon Programmer/Controller Model Number 823 supplied by Research, Incorporated of Eden Prairie, Minn. However, the sintering may be monitored by any other appropriate procedure. This sintering operation results in a noticeable strengthening of the cold pressed sodium chloride compact. Although particle necking or compact densification are not observed to significantly occur, the sintering process results in a substantial reduction in internal surface area, measured in square meters per gram, of the sintered compact as compared to the surface area of classified pulverized sodium chloride particles. It should be pointed out that in some, relatively few, situations the sintering step may be omitted from this procedure by going directly to the following step, but this is not generally preferred.

After the sodium chloride compact has been sintered, it is next partially immersed in a solution comprised of a phenolic polymer dissolved in a solvent selected from the group consisting of tetrahydrofuran, acetone, methyl ethyl ketone and ethanol, so that capillary action forces the solution to completely fill the internal pores of the sintered compact without the entrapment of air bubbles. The solution should be prepared at the concentration necessary to achieve the desired final carbon foam density. More specifically, the phenolic polymer may be any phenol-formaldehyde A-stage polymeric phenolic resin of either the resole type or the novolac type. If the resin is of the novolac type it is preferable, but not absolutely necessary, that the solution also contain a crosslinking agent selected from the group consisting of hexamethylene tetra-amine and para-formaldehyde. If the resin is of the resole type it is self-condensing and thus does not require a crosslinking agent. Phenolic polymers, including phenol-fommaldehyde A-stage polymeric phenolic resins, are very well-known and are described in "Textbook of Polymer Science" by F. W. Billmeyer, Jr., Interscience Publishers (1962), particularly at pages 463 to 469, which textbook is incorporated by reference herein. After the internal pores of the sintered compact are completely filled with the solution, the sintered compact is fully submerged in the solution until a uniform concentration of the phenolic polymer diffuses throughout the sintered compact. For optimal results, this step freouently requires a period of about 24 hours, or even longer. However, if an absolutely uniform concentration of the phenolic polymer is not required, a soaking period as short as about 4 hours may be adequate, but this is not preferred. The reason for this submerging step is that the phenolic polymer molecules are subject to a filtering or chromatographic effect as they diffuse through the pores of the sintered compact, and thus a substantial soaking period is required to give a uniform concentration of the phenolic polymer throughout the compact. It is particularly pointed out that by tailoring the particle size distribution of the pulverized sodium chloride particles of the compact, and, at the same time, controlling the concentration of the phenolic polymer in the solution that is diffused through the compact, botn the cell size distribution and the density of the carbon foam of this invention may be independently and simultaneously controlled, to provide tailored low density and very small cell size, or microcellular, carbon foams.

Following its removal from the phenolic polymer solution, the sintered compact is heated, in a convection oven to approximately 60 degrees centigrade, in air, for approximately 3 hours. This step is effective in removing the solution solvent from the compact by evaporation. Then the compact is further heated in a purging atmosphere of a mixture of inert gases selected from the group consisting of argon, nitrogen, and hydrogen to a temperature of approximately 600 to 700 degrees centigrade. The final heating should be performed slowly, over a time of at least 2 hours, at a rate determined so that thermal shocks do not produce cracks in the compact. This temperature of approximately 600 to 700 degrees centigrade is then maintained for approximately 2 hours, after which it is reduced to the ambient temperature over a time of approximately at least 2 hours. Because of this operation, the phenolic polymer that is diffused throughout the sintered compact pyrolyzes essentially without shrinkage into a carbon foam whose cell size is determined by the particle size distribution of the original classified, pulverized sodium chloride particles. That is, crosslinking occurs in the phenolic polymer and the resulting decomposition gases permeate out of the compact. This heating step may be performed with any appropriate laboratory furnace, such as the Model number 5465 6-V-S three-zone tube furnace, which is supplied by the Lindberg Company, a unit of General Signal Corporation, of watertown, Wis. The temperature control for this heating step may be provided by any appropriate means, such as those described above for the sintering step of this process. The phenolic polymer generally leaves behind about half of its original mass as carbon when slowly pyrolyzed to approximately 600 to 700 degrees centigrade in this operation. The pyrolysis of phenolics has been widely studied and is described in publications such as "Polymeric Carbons-Carbon Fibre, Glass and Char", by Jenkins et al, Cambridge University Press (1976), and "Heat-Resistant Polymers", by Critchley et al, Plenum Press (1983), both of which are incorporated by reference herein. Thermal expansion mismatches, the 825 degree centigrade melting point of sodium chloride, and the rapid densification of sodium chloride by sintering above about 750 degrees centigrade, all combine to prohibit this pyrolyzing step from being performed at any temperature above about 725 degrees centigrade.

Subsequent to the pyrolysis of the phenolic polymer to carbon, essentially all the sodium chloride of the sintered sodium chloride compact is leached away with water. This operation leaves the carbon foam, in a water-wet condition. This step may be conveniently executed by placing the sintered sodium chloride compact, that contains the carbon foam, in a dessicator, evacuating the dessicator, admitting water to the dessicator until the compact is covered with water and water has completely diffused throughout the compact without the entrapment of air bubbles, and then removing the vacuum. The water in the dessicator should be continuously stirred, and periodically replaced with fresh water until essentially all the sodium chloride is leached away. Alternatively, the wet compact may be subjected to a continuous flow of fresh water. As an aside, it is noted that Morton EF325 salt contains tricalcium phosphate as an anti-caking agent. This extraneous material may be removed at this point with a dilute nitric, or other appropriate, acid wash, with the residual quantity of acid being flushed away with water. However, it is specifically pointed out that the removal of tricalcium phosphate is not an integral element of the present invention. Adequate starting materials provided by other supplies may require other purifying steps of this nature.

The final step in the process is to freeze dry the water-wet carbon foam and thereby provide a machinable and structurally stable, tailored low density and microcellular carbon foam. Typically, the water-wet carbon foam is frozen at approximately $-40$ degrees centigrade by being placed upon a tray whose under surface is in contact with an alcohol and dry ice bath. Then the carbon foam is placed in a freeze dryer, under rough vacuum, that is initially at $-40$ degrees centigrade and gradually heated to approximately $-5$ degrees centigrade over a time of approximately 4 hours, and then held at approximately $-5$ degrees centigrade for approximately 4 days. Then the carbon foam is heated to approximately 40 degrees centigrade at a rate of approximately 5 degrees centigrade per hour. The carbon foam is then held at this temperature for approximately 16 hours. The freeze drying may be performed in conjunction with any appropriate freeze drying apparatus, such as freeze dryer Model 62012343, supplied by the Virtis Company of Gardiner, N.Y. However, the particular method of freeze drying is not extremely critical. In fact, for higher density carbon foams, one may replace the water in the water-wet foam with isopropanol by soaking, and then simply heat the foam at about 60 degrees centigrade in a convection oven until the carbon foam is dry.

As stated above, all aspects of this invention require, as a starting material, a quantity of pulverized sodium chloride particles, that may be additionally classified with respect to particle size distribution. when these sodium chloride particles are first mixed with a submicron size powder of a catalyst material selected from the group consisting of platinum, palladium, and nickel, the resulting quantity of sodium chloride and catalyst material particles may be used in the performance of this invention essentially in the same manner as discussed above. That is, the mixture of particles may be cold pressed into a compact having internal pores; the compact may be sintered; the sintered compact may be immersed and then submerged in a phenolic polymer solution; the phenolic polymer may be pyrolyzed by heating into a carbon foam; the sodium chloride of the particle mixture may be leached away with water; and the water-wet catalytically impregnated carbon foam may be freeze dried, all as described above. When this is done, the resulting product is a machinable, structurally stable, tailored low density and microcellular carbon foam that is catalytically impregnated. Materials such as platinum, palladium, and nickel are referred to herein as catalyst materials, even though they may actually function catalytically only when they are in very specific and unique configurations, such as in intimate contact with carbon.

The carbon and catalytically impregnated carbon foams of this invention are machinable on an EMCO FB-2 mill, supplied by Maier and Company of Hallein, Austria, provided with a fine-toothed blade operating at 250 to 333 Hertz. However, any generally equivalent mill is appropriate for machining the foams of this invention. Preferably, the foams are held in place under a partial vacuum during machining. It is also possible to machine the foams prior to the leaching step of the process of this invention, when the foams are still contained within a sodium chloride compact.

The invention will now be illustrated by the following examples:

EXAMPLE 1

A measure of Morton EF325 pulverized salt was classified by passage through an ACUCUT Model A-12 air classification system to provide a classified quantity of pulverized sodium chloride particles having a mean particle size, on a weight basis, of 17 microns. This classified quantity of sodium chloride particles was cold pressed, in a mold driven by a Carver Model C press, at a pressure of 2500 pounds per souare inch, for a time of 3 minutes, into a sodium chloride compact with internal pores having the shape of a bar with dimensions 20 by 2.5 by 1 centimeters, and having a density of 65 percent of the theoretical density of sodium chloride. This bar was sintered under argon in a Marshall Model 11893 three-zone tube furnace by heating the bar at the rate of 1 degree centigrade per minute to 710 degrees centigrade and then holding it at that temperature for 12 hours. The sintered bar was then allowed to cool to ambient temperature. Next, the sintered bar was partially immersed in a 30 percent weight to volume, i.e., 30 grams to 100 millileters, solution of phenolic polymer Number 29-104, a phenol-formaldehyde A-stage polymeric resin of the resole type, supplied by BTL Specialty Resin$ Inc., of Niagara Falls, N.Y., dissolved in tetrahydrofuran, for ½ hour, until the solution completely filled the internal pores of the compacted and sintered bar, without the entrapment of air bubbles. When the bar was fully submerged in the solution for a time of 20 hours, until a uniform concentration of the phenolic polymer had diffused throughout the bar. Following removal from the solution, the phenolic polymer in the bar was pyrolyzed to carbon by heating the bar in a convection oven to 60 degrees centigrade, in air, for 3 hours, and then further heating the bar to 700 degrees centigrade, slowly over a 12 hour period of time, in a purging atmosphere of argon, in a Lindberg Model 5465 6-V-S three-zone tube furnace. The bar was maintained at this elevated temperature for 2 hours, and then slowly cooled to ambient room temperature over a period of 16 hours. When the bar was placed in a the dessicator was evacuated, and water was admitted to the dessicator until the bar was covered with water and water had completely diffused throughout the bar without the entrapment of air bubbles. Then the vacuum was removed. The water was continuously stirred, and was replaced with fresh water every 8 to 16 hours for a 48 hour period. This process leached away essentially all the sodium chloride from the sintered sodium chloride compacted bar, leaving a carbon foam in a water-wet condition. Finally, the water-wet carbon foam was frozen at −40 degrees centigrade by being placed upon a tray whose under surface was in contact with an alcohol and dry ice bath, and then placed in a Virtis Model 62012343 freeze dryer at −40 degrees centigrade and under a rough vacuum. The carbon foam was then gradually heated to −5 degrees centigrade in 4 hours, held at −5 degrees centigrade for 4 days, and then heated to 40 degrees centigrade at a rate of 5 degrees centigrade per hour, at which temperature it was then held for 16 hours. Upon removal from the freeze dryer, a machinable and structurally stable carbon foam having a density of 40 mg/cc, and a median cell size of 15 microns, was provided.

EXAMPLE 2

A measure of Morton EF325 pulverized salt was classified by passage through an ACUCUT Model A-12 air classification system to provide a classified quantity of pulverized sodium chloride particles having a mean particle size, on a weight basis, of 17 microns. This quantity of particles was intimately mixed with submicron size platinum power supplied by Englehard, Corp., of Iselin, N.J., the platinum power comprising 2 weight percent of the resulting mixture. The sodium chloride and platinum mixture of particles was cold pressed, in a mold driven by a Carver Model C press, at a pressure of 2,500 pounds per square inch, for a time of 3 minutes, into a platinum impregnated sodium chloride compact with internal pores having the shape of a bar with dimensions 20 by 2.5 by 1 centimeters. The bar was sintered under argon in a Marshall Model 11893 three-zone tube furnace by heating the bar at the rate of 1 degree centigrade per minute to 710 degrees centigrade and then holding it at that temperature for 12 hours.

The sintered bar was then allowed to cool to ambient temperature. Next, the sintered bar was partially immersed in a 35 percent weight to volume solution of phenolic polymer Number 29-104, a phenol-formaldehyde A-stage polymeric resin of the resole type, supplied by BTL Specialty Resins, Inc., of Niagara Falls, N.Y., dissolved in acetone for ½ hour, until the solution completely filled the internal pores of the compacted and sintered bar, without the entrapment of air bubbles. Then the bar was fully submerged in the solution for a time of 24 hours, until a uniform concentration of the phenolic polymer had diffused throughout the bar. Following removal from the solution, the phenolic polymer in the bar was pyrolyzed to carbon by heating the bar in a convection oven to 60 degrees centigrade, in air, for 3 hours, and then further heating the bar to 700 degrees centigrade, slowly over a 12 hour period of time, in a purging atmosphere of argon, in a Lindberg Model 5465 6-V-S three-zone tube furnace. The bar was maintained at this elevated temperature for 2 hours, and then slowly cooled to ambient room temperature over a period of 16 hours. Then the bar was placed in a dessicator, the dessicator was evacuated, and water was admitted to the dessicator until the bar was covered with water and water had completely diffused throughout the bar without the entrapment of air bubbles. Then the vacuum was removed. The water was continuously stirred, and was replaced with fresh water every 8 to 16 hours for a 48 hour period. This process leached away essentially all the sodium chloride from the sintered and platinum impregnated sodium chloride compacted bar, leaving a platinum impregnated carbon foam in a water-wet condition. Finally, the water-wet, platinum impregnated carbon foam was frozen at −40 degrees centigrade by being placed upon a tray whose under surface was in contact with an alcohol and dry ice bath, and then was placed in a Virtis Model 62012343 freeze dryer at −40 degrees centigrade and under a rough vacuum. The platinum impregnated carbon foam was then gradually heated to −5 degrees centigrade in 4 hours, held at −5 degrees centigrade for 4 days, and then heated to 40 degrees centigrade at a rate of 5 degrees centigrade per hour, at which temperature it was then held for 16 hours. Upon removal from the freeze dryer, a machinable, structurally stable, platinum impregnated carbon foam having a density of 80 mg/cc, and a median cell size of 15 microns, was provided.

It is thus appreciated that in accordance with the invention as herein described, both machinable and structurally stable, tailored low density and microcellular carbon, and catalytically impregnated carbon, foams, and process for their ready preparation, are provided.

The foregoing description of a preferred embodiment of the invention has been presented for purposes of illustration and description. It is not intended to be exhaustive or to limit the invention to the precise form disclosed, and obviously many modifications variations are possible in light of the above teaching. For example, instead of using pulverized sodium chloride particles, potassium chloride particles or very small glass spheres or particles may be pressed into compacts suitable for the performance of variations of the present invention. Of course, when using glass particles, the leaching step must be performed with hydrofluoric acid instead of water. Additionally, immersing solutions comprised of epoxy resin or furfuryl alcohol monomer may be pyrolyzed into carbon foams in accordance with the basic teaching of this invention. Also, instead of simply mixing catalyst material powders with pulverized sodium chloride particles, the catalyst material may be vacuum deposited onto pulverized sodium chloride particles by techniques that are substantially disclosed by Land in U.S. Pat. No. 3,295,972 issued Jan. 3, 1967. Additionally, catalyst material may be diffused into the carbon foams of this invention by allowing the foams, when water-wet, to soak in aqueous solutions containing the catalyst materials, such as dilute chloroplatinic acid, for appropriate periods of time. When performing this technique, following freeze drying, the carbon foams must be reheated in a purging atmosphere to decompose the compound that contains the catalyst material.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A process for producing a machinable, structurally stable, catalytically impregnated, low density microcellular carbon foam having a density of about 40 mg/cc and a median cell size of about 15 microns, the process comprising the steps of:

classifying a measure of pulverized sodium chloride particles, by passing the measure through an air classification system, to remove both fines and large particles, to thereby provide a classified quantity of pulverized sodium chloride particles having a mean particle size in the approximate range from 10 to 20 microns;

mixing the classified quantity of pulverized sodium chloride particles with a sub-micron size powder of a catalyst material selected from the group consisting of platinum, palladium, and nickel, to thereby provide a quantity of pulverized sodium chloride and catalyst material particles;

cold pressing the quantity of pulverized sodium chloride and catalyst material particles, at a pressure in the approximate range from 2000 to 5000 pounds per square inch, and for a time of approximately 1 to 5 minutes, into a catalytically impregnated sodium chloride compact having internal pores;

sintering and thereby strengthening the catalytically impregnated sodium chloride compact, by heating the compact at the approximate rate of 1 degree centigrade per minute to a temperature in the approximate range from 650 to 725 degrees centigrade, then by maintaining the compact at that temperature for approximately 2 to 12 hours, and then by cooling the compact to ambient temperature;

preparing a solution comprised of a resole or novolac phenol-formaldehyde A-stage polymeric phenolic resin dissolved in a solvent selected from the group consisting of tetrahydrofuran, acetone, methyl ethyl ketone, and ethanol;

partially immersing the sintered catalytically impregnated sodium chloride compact in the solution so that capillary action forces the solution to completely fill the internal pores of the sintered compact without the entrapment of air bubbles, and then submerging the sintered compact in the solution until a uniform concentration of the phenolic resin has diffused throughout the sintered compact;

heating the sintered catalytically impregnated sodium chloride compact, through which the phenolic resin has uniformly diffused, to approximately 60 degrees centigrade in air for approximately 3 hours, and then further heating the compact in a purging atmosphere comprised of a mixture of inert gases selected from the group consisting of argon, nitrogen, and hydrogen, to a temperature in the approximate range from 600 to 700 degrees centigrade, then maintaining the sintered catalytically impregnated compact in the purging atmosphere and at that temperature for approximately 2 hours, so that the phenolic resin that is diffused throughout the sintered catalytically impregnated compact pyrolyzes essentially without shrinkage into a carbon foam that is impregnated with the catalyst and whose cell size is determined by the particle size distribution of the pulverized sodium chloride and catalyst material particles;

leaching away with water essentially all the sodium chloride from the sintered catalytically impregnated sodium chloride compact, so that the catalytically impregnated carbon foam in a water-wet condition remains; and freeze drying the water-wet catalytically impregnated carbon foam, so that the water-wet catalytically impregnated carbon foam when dried becomes said machinable, structurally stable, catalytically impregnated, low density microcellular carbon foam.

2. A process as recited in said resin is a noveolac phenolic resin and in which the solution further comprises a crosslinking agent selected from the group consisting of hexamethylene tetra-amine and para-formaldehyde.

* * * * *